US012790267B2

(12) United States Patent
Carlson

(10) Patent No.: US 12,790,267 B2
(45) Date of Patent: Nov. 10, 2026

(54) WASTE-TO-ENERGY PRODUCTION CONJOINED WITH PORTLAND CEMENT PRODUCTION

(71) Applicant: Joseph Wendell Carlson, Riverton, UT (US)

(72) Inventor: Joseph Wendell Carlson, Riverton, UT (US)

( * ) Notice: Subject to any disclaimer, the term of this patent is extended or adjusted under 35 U.S.C. 154(b) by 351 days.

(21) Appl. No.: 18/736,510

(22) Filed: Jun. 6, 2024

(65) Prior Publication Data

US 2024/0409459 A1 Dec. 12, 2024

Related U.S. Application Data

(60) Provisional application No. 63/471,312, filed on Jun. 6, 2023.

(51) Int. Cl.

| | |
|---|---|
| ***C04B 7/43*** | (2006.01) |
| ***B01J 6/00*** | (2006.01) |
| ***C04B 7/36*** | (2006.01) |
| ***C04B 7/44*** | (2006.01) |
| ***C10B 53/00*** | (2006.01) |
| ***C10B 57/06*** | (2006.01) |
| ***F27B 7/00*** | (2006.01) |

(52) U.S. Cl.

CPC ............... *C04B 7/434* (2013.01); *B01J 6/008* (2013.01); *C04B 7/365* (2013.01); *C04B 7/4423* (2013.01); *C04B 7/4438* (2013.01); *C10B 53/00* (2013.01); *C10B 57/06* (2013.01); *F27B 7/00* (2013.01); *F27M 2003/02* (2013.01); *F27M 2003/03* (2013.01)

(58) Field of Classification Search

None

See application file for complete search history.

(56) References Cited

U.S. PATENT DOCUMENTS

| | | | |
|---|---|---|---|
| 7,384,615 | B2 | 6/2008 | Boardman et al. |
| 7,708,964 | B2 | 5/2010 | Boardman et al. |
| 9,169,440 | B2 | 10/2015 | Carlson |

OTHER PUBLICATIONS

Plaza, Marta G., et.al. [Oct. 2020]. "CO2 Capture, Use, and Storage in the Cement Industry: State of the Art and Expectations". Energies. 13 (21): 5692.

Dean, C.C., et.al. [Jun. 2011]. "The Calcium Looping Cycle for CO2 Capture from Power Generation, Cement Manufacture and Hydrogen Production." Chemical Engineering Research and Design, 89 (6): 836-855).

Ahn, Hyungwoong, et.al. (Aug. 2013), "Process Configuration Studies of the Amine Capture Process for Coal-Fired Power Plants." International Journal of Greenhouse Gas Control. 16: 29-40).

Clayson ("Combustion of Municipal Solid Waste with Oil Shale in a Circulating Fluidized Bed," Department of Energy Grant No. DE FGO! 94CE15612, Jun. 6, 1996, Energy Related Inventions Program Recommendation No. 612, Inventor R.F. Clayson, NIST.).

Jie Liu, et.al., ("Thermal Desorption of PCBs Contaminated Soil with Calcium Hydroxide in a Rotary Kiln," Chemosphere, vol. 220, Apr. 2019, pp. 1041-1046.).

*Primary Examiner* — Stefanie J Cohen

(74) *Attorney, Agent, or Firm* — Angus C. Fox, III

(57) ABSTRACT

A Portland cement production (PCP) process is conjoined with a waste-to-energy (WTE) process using refuse-derived fuels (RDFs). Both processes operate simultaneously to reduce harmful compounds being discharged into the environment. The PCP and WTE processes are conjoined by borrowing a minor portion of pre-heated comminuted limestone from a PCP process feedstream and diverting it to the WTE process. Some of the pre-heated comminuted limestone is converted to CaO. The calcium compounds from the pre-heated comminuted limestone act as a fluxing agents and sorbents to bind with and remove undesired impurities, such as elemental particulate matter, excess $CO_2$ and acid gasses associated with sulfur and chlorine that are released during the pyrolization of RDFs. The ash, char waste and reacted calcium compounds from the pyrolization process can be comingled and returned to the PCP process as a secondary cement meal feedstock.

18 Claims, 1 Drawing Sheet

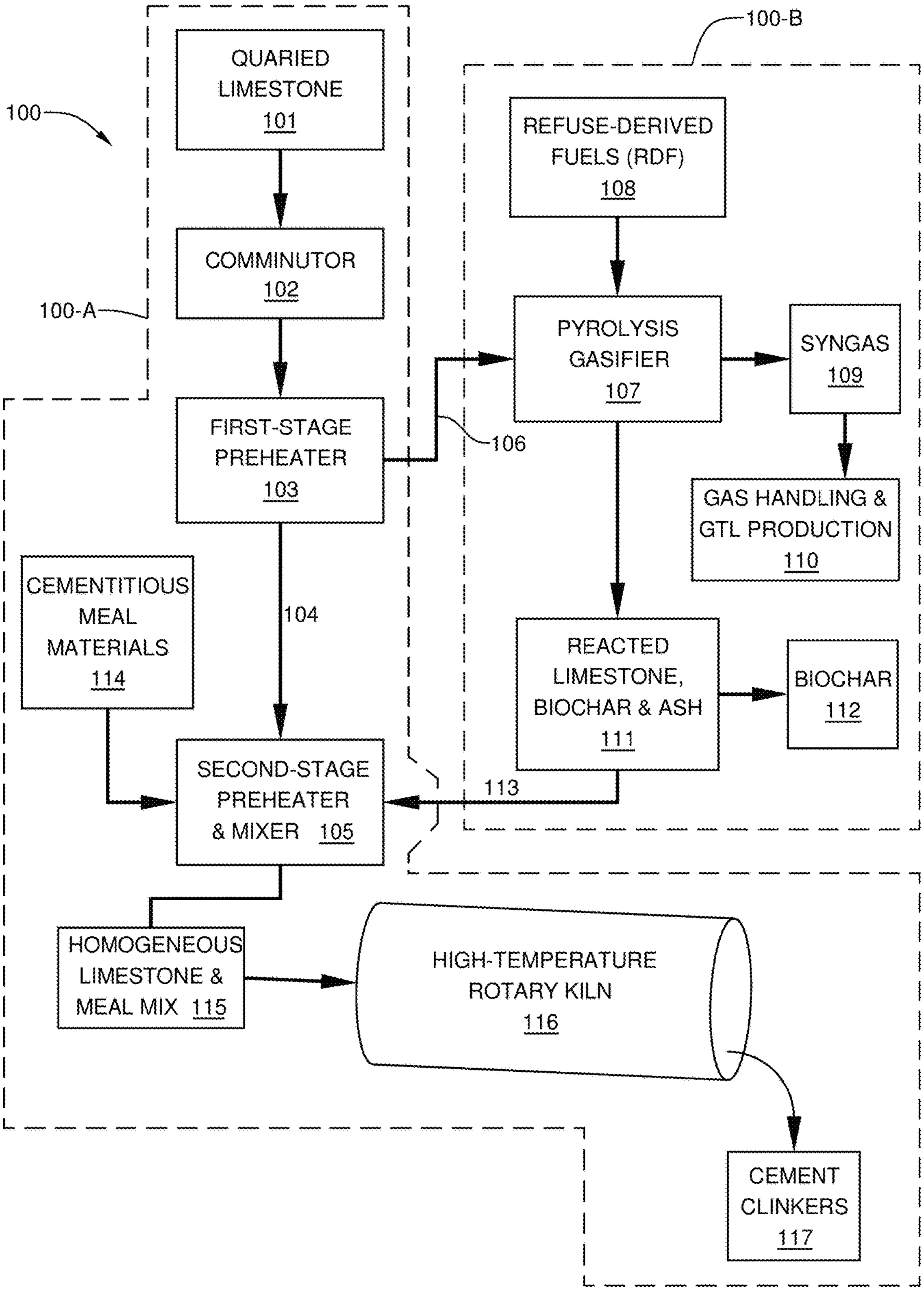
100
100-A
100-B
QUARIED LIMESTONE 101
COMMINUTOR 102
FIRST-STAGE PREHEATER 103
104
106
REFUSE-DERIVED FUELS (RDF) 108
PYROLYSIS GASIFIER 107
SYNGAS 109
GAS HANDLING & GTL PRODUCTION 110
REACTED LIMESTONE, BIOCHAR & ASH 111
BIOCHAR 112
113
CEMENTITIOUS MEAL MATERIALS 114
SECOND-STAGE PREHEATER & MIXER 105
HOMOGENEOUS LIMESTONE & MEAL MIX 115
HIGH-TEMPERATURE ROTARY KILN 116
CEMENT CLINKERS 117

WASTE-TO-ENERGY PRODUCTION CONJOINED WITH PORTLAND CEMENT PRODUCTION

This application has a priority date based on the filing of Provisional Patent application No. 63/471,312 by the same inventor on Jun. 6, 2023.

BACKGROUND OF THE INVENTION

1. Field of the Invention

This invention relates, generally, to conjoined processes for producing both fuels and Portland cement using calcium compounds as adsorbents to minimize the escape of harmful compounds into the environment during waste-to-energy production, and then combining the reacted calcium compounds, containing adsorbates, with comminuted limestone as raw materials in the cement production process.

2. Description of Related Prior Art

Global energy production is largely that of conventional hydrocarbon-based fuels (including petroleum products, natural gas, etc.), which have been and will remain a majority of the energy supply to satisfy energy demands. Alternative and renewable energy have become the "green" desire of energy producers to replace conventional energy production. Renewable and alternative energy research and development efforts have included the search for improved techniques, systems and methods for producing energy from renewable biomass or recycled carbonaceous waste matter. Contemporary research has also focused on potential new sources of energy as well as improvements in existing alternative energy sources. For example, efforts to improve solar technology, wind energy production, bio-fuel production and waste-to-energy production are all ongoing. Additionally, global Portland cement producers have also expressed the desire to reduce the total energy demand required to produce cement by using more renewable fuel sources. Cement production generates large quantities of CO2 derived from the combustion heating requirements to calcine and sinter cementitious materials into Portland cement. As one example of methods to reduce total energy consumption and vagrant CO2, cement producers are turning to natural volcanic pozzolans as substitute manufacturing additives rather than using fly-ash generated as a byproduct of coal-fired power plants and other coal combustion processes.

Other methods have been proposed to reduce carbon dioxide emissions in industrial consumption and energy production industries. One such carbon dioxide sequestration method currently known in the public domain is referred to as calcium looping or calcium cycling. This method of calcium looping or calcium cycling is first described below to differentiate the present invention from the present prior art to uniquely contrast the independent purposes, objects and claims of the present invention.

The related current art of calcium looping is a closed-loop cycle technology that is used to capture carbon dioxide (CO2) from power plants and other industrial sources. Now recently referred to as second generation carbon capture (For example, see Plaza, Marta G., et. al. [October 2020]. "CO2 Capture, Use, and Storage in the Cement Industry: State of the Art and Expectations". Energies. 13 (21): 5692.), this calcium hydroxide process was first discovered and described by Sir Humphry Davy, an English chemist, who isolated calcium and its various compound arguments and reactions commencing in 1808. The calcium looping cycle has also been proposed for expanded carbon capture. (See Dean, C. C., et. al. [June 2011]. "The Calcium Looping Cycle for CO2 Capture from Power Generation, Cement Manufacture and Hydrogen Production." Chemical Engineering Research and Design, 89 (6): 836-855). Specifically, the present invention does not use calcium looping also known as calcium cycling. The known calcium looping process involves the use of calcium oxide (CaO) or calcium hydroxide (Ca(OH)2), which are both derived from heated limestone as a sorbent to remove CO2 from a flue gas stream for amine scrubbing (See Ahn, Hyungwoong, et. al. (August 2013), "Process Configuration Studies of the Amine Capture Process for Coal-Fired Power Plants." International Journal of Greenhouse Gas Control. 16:29-40).

In a typical calcium looping system, the flue gas is passed through a reactor that contains the calcium-based sorbent material, which reacts with the CO2 to form calcium carbonate (CaCO3) and water (H2O). This reaction is exothermic, meaning that it releases heat, which can be recovered and used for other heat dependent in situ processes. The calcium carbonate that is produced in the reactor is then removed from the flue gas stream and transported to a separate vessel, where it is heated to release the CO2 to regenerate the original sorbent material to be reused. This process, called calcination, produces CaO, which can be recycled back into the reactor to capture more CO2. These recurring processes are calcination and carbonation. Carbonation is the reverse of calcination given by CaCO3↔CaO+CO2. Thus, reacted calcium ends where it begins to repeat the reaction to be used over and over again (note the bilateral reaction arrows).

The calcium looping process has several advantages over other carbon capture technologies. First, it is relatively simple and inexpensive, as it uses abundant and inexpensive materials-limestone. Second, it has a high CO2 capture efficiency, with some studies reporting up to 90% capture rates. Finally, the process is scalable and can be used in a wide range of industrial applications, including power generation, cement production, and steelmaking. One observation is clear from an analysis of the prior art calcium looping process: The process always ends where it starts, in that it is a closed cycle.

Other related prior art, identified below, describes various methods relating to the sorbent reactions of calcium. The selected prior art, disclosed here below, shows a framework of various linear processes of sorbent reactions of calcium compounds being (a) mixed with Municipal Solid Waste (MSW) and (b) not mixed with MSW and (c) also using spent oil shale and (d) not using spent oil shale and (e) also using combustion and (f) not using combustion for thermal conversion reactions.

Carlson (U.S. Pat. No. 9,169,440 B2) claims a sequential linear process method of using spent hot rock char being passed along as the residuum of oil shale retorting having been generated in a first rotary kiln to then be continuously discharged into a second rotary kiln where the heated char particles will act as a concomitant sorbent of impurities in the production of synthesis gasses generated by pyrolysis of MSW being concurrently pyrolyzed in the absence of oxygen in the second rotary kiln resulting in the production of purer synthesis gasses derived as renewable energy components generated from wastes. The apparent disadvantages and constraints of Carlson in its claims are (1) its dependency upon the availability of spent oil shale or unreacted parent oil shale to be retorted for its char and (2) to be located within the economic boundaries of transportation costs associated with mining, shipping and handling of said oil shale resources and for the incorporation of said spent oil shale char being used to achieve the claimed sorbent processes disclosed.

Boardman, et. al. (U.S. Pat. Nos. 7,384,615 and 7,708,964) claims methods of thermal conversion processes of coal by combusting calcium-rich oil shale therewith to react and capture pollutants and acid gasses as a sorbent of at least one of such resulting deleterious gas species of products of combustion. Relying extensively upon prior known art of alkali chemistry, Boardman identified more than 24 useful calcium-based sorbent reactions also forming pollution capturing compounds of calcium during concurrent coal co-combustion—the plurality of which are resulting chemical compounds identified as calcium salts. Notwithstanding the useful nature of the sorbent activity of oil shale, the disadvantage of Boardman is the growing disfavor of using coal combustion and its hydrocarbon components as a preferred energy resource rather than pursuing the production of renewable energy from alternative renewable resources.

Clayson ("Combustion of Municipal Solid Waste with Oil Shale in a Circulating Fluidized Bed," Department of Energy Grant No. DE FGO! 94CE15612, Jun. 6, 1996, Energy Related Inventions Program Recommendation No. 612, Inventor R. F. Clayson, NIST.) first disclosed how that a fractional addition of oil shale acted as an in-line sorbent by scrubbing the thermal conversion processes generating acid gasses during the co-combustion of MSW which was first sorted and separated from non-combustible inorganic matter. Rather than full combustion of MSW as per Clayson to produce boiler heat for electrical turbine energy generation, contemporary renewable energy preferences view the reforming of MSW into transportation fuels as an improved use for growing carbonaceous waste streams. Another disadvantage of combusting oil shale with MSW is the continuous disposal of byproducts of slag and char needing to be buried into approved repositories and landfills.

Jie Liu, et. al., ("Thermal Desorption of PCBs Contaminated Soil with Calcium Hydroxide in a Rotary Kiln," Chemosphere, Volume 220, April 2019, Pages 1041-1046.) reported the synergistic application of the widely known base characteristics of calcium compounds to strengthen the removal of polychlorinated biphenyls (PCBs) found in contaminated soils using a rotary kiln. One percent (1%) of calcium hydroxide was added in-line to chemically contaminated soils in a rotary kiln operated at between 300° C. to 600° C. achieving a removal efficiency reaching 94% showing significant dechlorination and detoxication of said PCBs entrained soils. The published study showed the economical and thermal desorption processes of inorganic calcium compounds reacting with hazardous organic materials (volatile organic compounds) given their various temperatures and best residence times controlled in the rotary kiln. A disadvantage of Liu is that it fails to comprehend or handle the potential presence of much larger quantities of deleterious organic matter to the mass fraction of inorganic matter in a continuous thermal reduction process.

Municipal Solid Waste (MSW), being organic matter, is a qualified offset feedstock to produce renewable waste-to-energy because it is not adding to the total of available free carbon base required for energetic carbon-oxygen reactions. MSW has also been used as a renewable heat source to produce cement to offset additional and intense carbon usage. This use of MSW as a renewable energy feedstock is not one of the objects but is a beneficiary of the present invention. The present invention addresses the object of reducing undesirable process byproducts and improving conditions for producing waste-to-energy. As such, after separation of inorganic matter, MSW is comprised of a highly varied mix of organic matter also containing various species of undesirable elements. As MSW contains undesirable elements when gasified, these random undesirable elements become acid gasses that can reduce process efficiency for downstream processing of desirable gasified materials. The present invention addresses these known purification issues to efficiently and effectively conjoin industries more easily.

Furthermore, Boardman, Clayson and Carlson list oil shale and spent oil shale as a requisite component of their disclosed prior art. Oil shale is composed of a plurality of calcium especially after retorting and removal of light kerogens components. Limestone also contains a plurality of calcium. Unlike Boardman, Clayson, Liu and Carlson's linear approach, the present invention describes an alternative non-linear but circular method of looping preheated comminuted limestone primarily composed of calcium diverted from a first separate cementitious train of limestone matter then being conveyed to a second train of commingled limestone particles heated together with RDF derived from MSW to achieve certain concurrent pyrolytic reactions for renewable energy production whereupon a combined train of residual reacted reductants and byproducts generated thereby are then returned as a resulting third train of residual reacted matter conveyed back to the first associated cementitious train to combine therewith eventually entrained with other limestone already bound for cement production along with returning material with additional properties and characteristics derived from reactions within the second pyrolysis train.

OBJECTS OF THE INVENTION

The present invention was formulated with several objects in mind. The main purpose of the present invention is to facilitate the purification of synthesis gasses generated from pyrolysis by the primary production of useful calcium salts to remove pollutants. The secondary purpose of the present invention is to facilitate the potential capture of surplus carbon dioxide in the presence of unreacted calcium and oxygen. These purposeful facilitations create important objects of the present invention.

The first object of the present invention is to integrate the process of fuel synthesis from the pyrolysis of Municipal Solid Waste (MSW) and the manufacture of Portland cement in order to create economies of scale and process synergies. MSW contains substantial untapped renewable energy. Energy is the most consumed resource of our modern civilization. Next to water consumption, cement consumption is the second most used resource in the world. Therefore, the unique technical purpose of the present invention is to remediate byproduct pollutions and empower joint process economic sustainability. This object incentivizes two indispensable industries to become more interdependent. This object enables vertical integration and all the potential direct and indirect industrial economic benefits that are derived therefrom. This object is ultimately accretive to capital formation and value creation.

The second object of the present invention is to reduce the release of vagrant methane gasses seeping from landfills by also reducing the reliance on landfills for municipal waste disposal. Landfills are unwanted yet indispensable public goods and are also a suboptimal land use that crowds out alternative and higher land uses for the common good. As a consequence of current waste disposal policies, usable land is becoming more scare. After closure, landfills become unusable real property spaces for generations, creating large opportunity costs and negative social externalities.

The third object of the present invention is to help balance the heat requirements and mass transport of materials of two heretofore ununited industries into two conjoined industrial processes to reduce energy loss and lower material handling costs. This object relates not only to direct internal process requirements, but also drives the reduction of external costs in external procurements and material transportation.

The fourth object of the present invention is to utilize comminuted particles of limestone, which have already been heated in preparation for use in the cement manufacturing process, and temporarily divert a minor portion of them, from a main material feed stream, for heating during pyrolysis in combination with refuse-derived fuels (RDF) harvested form MSW, in order to achieve concurrent calcium attrition and calcium sulfation and other reactions for the purification of synthesis gasses being the predominant products of the pyrolysis process.

A fifth object of the invention is to communicate and return the still heated and comminuted reacted and unreacted calcium compounds also comprised of calcium salts and other arguments of calcium generated during combined pyrolysis to reduce environmental pollutions thereafter to be continuously sequestered and conveyed back to the main material feed stream at a point downstream whence it was previously diverted.

A sixth object of the invention is to utilize the returned comminuted unreacted and reacted calcium compounds for the enhancement of cement production also utilizing any produced calcium salts and other arguments of calcium contained therein that were generated during combined pyrolysis.

A seventh object of the invention is to also generate useful byproducts of residuum. For example, biochar, which is extracted and conveyed together with the calcium salts and other calcium compounds generated during and after combined pyrolysis can either be reintroduced into the main feed stream, along with the extracted calcium compounds, or it can be separated from the calcium compounds prior to entry into the main feed stream as a biochar byproduct, which can be used for the manufacture of, carbon fiber, graphite, graphene (a graphite allotrope of carbon containing numerous do carbon blackcarbon black uble bonds) or other advanced materials made from carbon.

However, as those of ordinary skill in the art will recognize, all of these objectives and advanced manufacturing efforts for environmental remediation may be beset with various economic, political and scientific obstacles.

SUMMARY OF THE INVENTION

Municipal Solid Waste (MSW) contains, after sorting, over 90% organic matter suitable for use as renewable and sustainable refuse derived fuels (RDF). Cement-grade Portland cement production (PCP) with waste-to-energy (WTE) production utilizing the chemical properties and reactions of calcium used in PCP to help separately sequester any excess carbon dioxide (CO2) and other impurities found in produced synthesis gases derived from pyrolyzed wastes generated during WTE production, which could damage downstream equipment or reduce efficiency of synthesis gas-to-liquid (GTL) conversion processes and other refining methods. This is accomplished by diverting a portion of preheated and unreacted comminuted limestone from the main cement production feed stream, as a slipstream, to a separate waste-to-energy pyrolysis gasifier where pulverized RDF obtained from MSW are jointly mixed and heated together to produce synthesis gases (syngases) and concurrent byproducts of char waste and reacted limestone that acted as a sorbent of any excess $CO_2$ and other synthesis gas impurities during waste pyrolysis. These byproducts of continuous WTE production, which include reacted limestone and char residuum, are then extracted from the pyrolysis gasifier and conveyed, as a secondary cement meal feedstock, to rejoin the main cement production feed stream, to be eventually superheated with other cementitious feedstocks in a rotary kiln, where they are sintered and vitrified into finished Portland cement clinkers. The reacted limestone and carbonaceous char residuum act to enhance the downstream cement calcining process and to supplement the heating requirement for limestone meal sintering accomplished in a rotary kiln. The reduction in carbon emissions is achieved by additional renewable waste-to-energy resources of MSW being used in the conjoined processes disclosed herein. The present invention also provides more purified synthesis gases derived from the pyrolytic waste gasifier utilizing the unique chemical properties and reactions of calcium borrowed from associated cement production to enhance the downstream GTL processes of the separate WTE facility described in the present invention.

Thus, the PCP and the WTE processes are conjoined by diverting a portion of pre-heated comminuted limestone from the PCP process to the WTE process. By preheating the comminuted limestone, some of it is converted to CaO. These modified calcium compounds from the PCP process are delivered to the WTE process, where they react with unreacted excess $CO_2$, impurities and potential pollutants released during the pyrolization of refuse-derived fuels. The ash, char waste and reacted calcium compounds from the pyrolization process are commingled and reintroduced into PCP process, where they are used as a secondary cement meal feedstock.

The present invention, clearly distinguishable from the heretofore cited prior art, is neither anticipated nor obviated thereby, and provides a significant increase in efficiency and effectiveness in the production of both synfuels and cement. As such, the present invention provides numerous technical and economic advantages over the prior art.

A first advantage is achieved by the conjoining of waste-to-energy production with Portland cement production in a single location. As such, feedstock components prepared for cement production enhance renewable energy production; and feedstock components derived from renewable energy enhance cement production. This interdependent circular feedstock method provides stoichiometric support for useful chemical reactions that may take place at various sustained and transferred temperatures shared by the purposefully conjoined processes of cement production with waste-to-energy production.

The second advantage leverages fortuitous industrial locations to combine production facilities by the proximity of cooperating cities having municipal waste generating population centers that are also near cement production centers resulting in favorable integrated production and resulting use of finished cement products and finished renewable fuel products exploiting the present invention.

The third advantage uses the coincident available and extensible infrastructure which can be leveraged and cost effectively shared in a singular integrated industrial location for the establishment of joint production facilities comprehended by the present invention. This advantage also affords the opportunity to co-locate new waste-to-energy facilities with existing cement production facilities to create new industrial expansion, new synergies and economies of scale. This co-location advantage using the new technology affords faster innovation adoption and greater development of potential industrial sites.

The fourth advantage expands workforce opportunities that are multiplied by jointly balanced industrial expansion where work skills can also be cross-trainable by the industrial co-location. With the conjoining of industrial facilities, associated labor and surrounding support industries and vendors experience accelerated incremental growth by industrial combinations enabled by the present invention.

The fifth advantage brings about local system integrations and additional cost reductions made possible by having similar transportation routes, shared material transfer and conveyance methods, similar material and thermal reduction technologies, common maintenance procedures and similar safety practices.

The sixth advantage simplifies government regulations and ecological compliance by jointly conforming land and industrial production methods in one location having similar existing or new zoning constraints and permitting requirements. As such, reasonable and timely approvals may be obtained from institutions for sustainable economic development by unifying obvious mutual public policy benefits demonstrated by the present invention.

The seventh advantage alleviates environmental impact issues and conditions that are mitigated by joint production operations that empower the selection of best available control technologies and practices. For public policy advancements, obvious positive environmental impacts are achieved by reducing landfills while producing renewable energy and value-added infrastructure materials in one location.

The eighth advantage is improved and greener production methods that create mutually repositioned finished materials and energy goods in more acceptable marketing segments and sustainable categories that have higher consumption preferences. This creates superior goods at stable and sustainable prices.

The ninth advantage is that by cleaning up the WTE process, the production facilities may be nearer population centers without creating a health hazard for many.

The tenth advantage encourages entrepreneurship and private investment with new partnering, joint ventures and establishment of public-private-partnerships (PPPs). Private cement production may join with waste-to-energy production originated from public resources that creates the opportunity to form PPPs that are entities growing in utility and usage in modern commerce to structure ownership and establish enterprises producing goods of critical importance in regular trade.

The eleventh advantage presents new opportunities for PPPs for capital formation by the issuance of public financing instruments for capital investment which provides financial assets having greater utility, safety, liquidity and yield created from the persistent dividends generated from reoccurring revenue derived from underlying highly demanded materials and sustainable fuels.

In consideration of the foregoing, the overarching and essential economic growth factors of (a) new technology, (b) effective institutions and (c) available resources for advancement of mankind are manifest and enabled by the present invention by not only conjoining critical cement material resources and their associated production methods with methods for the production of renewable energy using municipal solid wastes, but to also incentivize and amalgamate social and environmental preferences thereby attracting capital investment and cooperating institutions with their accompanying critical city services contributing therefrom a purposeful diversion of unused carbonaceous waste resources lending to the reduction of the use of landfills for the optimum removal of environmental pollutants and other negative externalities to ultimately increase the rate of general technological adoption for the advancement of mutual interests, prosperity and the health and welfare of societies.

BRIEF DESCRIPTION OF THE DRAWINGS

FIG. 1 is a block diagram of a Portland cement production (PCP) process conjoined with a waste-to-energy (WTE) process.

DETAILED DESCRIPTION OF THE INVENTION

The invention will now be described in detail with reference to the attached drawing FIGURE. Referring now to FIG. 1, a conjoined process 100 includes a Portland cement production (PCP) process 100-A conjoined with a waste-to-energy (WTE) process 100-B, which operate simultaneously.

Both the PCP process 100-A and the WTE process 100-B are comprised of numerous steps. Not shown in FIG. 1 in connection with Process 100-A are other system elements generally comprised fore and aft of combined material flows of comminuted limestone and critical and corrective crushed additives selected from an array of fly ash, clay, bauxite, iron ore, gypsum and sand being handled by processing equipment customarily selected from an array of quarrying machinery, bulk transportation, crushing, weighing, conveyors, cyclones, calcining preheaters, rotary kiln with burners, heat recovery systems, condensers, clinker handling and ball milling with finished cement storage silos that would be collectively included in a typical plurality of materials, equipment and systems in the well-known art of PCP processes.

Also not shown in FIG. 1 in connection with the WTE process 100-B are other process elements generally comprised fore and aft of material flows composed of renewable refuse-derived fuels (RDF) and associated WTE processing equipment customarily selected from an array of municipal solid waste (MSW) aggregation equipment, waste handling, waste sorting, grinding and pulverizing equipment, conveying systems, sealed gates, RDF injecting screw augers, RDF pyrolysis gasifiers, shift reactors, steam generators, vessels, columns, gas clean-up systems, catalytic systems including Fischer-Tropsch-like synthesis gas-to-liquid (GTL) processing systems together with pumps, compressors, condensers, water recovery systems, heat recovery systems, upgrading hydrotreaters and hydrocrackers that would be included in a typical plurality of materials, equipment, piping and systems in the well-known art of pyrolysis derived synthesis GTL refining included in WTE process 100-B associated with the conjoined process 100. In order to pyrolyze RDF, various heating temperatures are utilized at different steps ranging from ordinary ambient temperature to 950° Celsius with accompanying process pressures applied to RDF streams ranging from one Bar of pressure to over 55 Bars.

In order to implement the PCP process 100-A, various heating temperatures are also utilized at different steps ranging from ordinary ambient temperature to increased calcining temperatures and, ultimately, to sintering temperatures of 1450° Celsius. In reference to the block diagram array of PCP process 100-A, quaried limestone 101 is selected as the process point to commence the illustration of the present invention. The quaried limestone 101, which is primarily $CaCO_2$, is delivered to a comminutor 102, which pulverized it. The pulverized or comminuted limestone from the comminutor 102 is delivered to a first-stage preheater 103, which is a suitable heating containment vessel or cyclone preheater. In the first-stage preheater 103, the comminuted limestone is heated to approximately the same temperature as the operating temperature of a pyrolysis gasifier 107 of the WTE process 100-B, which can be as high as 950° Celsius. At this temperature, much of the pre-heated comminuted limestone is converted to calcium oxide, or CaO. A majority of the heated comminuted limestone is discharged and conveyed from a first port in the first-stage preheater 103, as a first slipstream 104, to a second-stage preheater and mixer 105.

A second slipstream 106 of preheated comminuted limestone is discharged and conveyed from a second port in the first stage-preheater 103 to the pyrolysis gasifier 107. As previously stated, the preheated, comminuted limestone in both the first and second slipstreams 104 and 106, respectively, are heated in the first-stage preheater 103 to a temperature approximately the same as the operating temperature of the pyrolysis gasifier 107. At temperatures approaching 950° Celsius, much of the pre-heated comminuted limestone, which initially was primarily calcium carbonate or $CaCO_2$, is converted to calcium oxide, or CaO. After entering the pyrolysis gasifier 107, the heated comminuted limestone from the second slipstream 106 is conjointly comingled and heated with the refuse-derived fuels RDF 108 during a pyrolysis gasification step in the pyrolysis gasifier 107. The pyrolysis gasifier 107, used for suitable continuous pyrolysis of RDF 108 to produce syngas 109 for GTL renewable energy production, may be selected from an array of pyrolysis equipment such as rotary kilns being directly, indirectly fired and inductively heated, steam reforming reactors, from partial retorting reactors being designed as either updraft, downdraft, side-draft with normal air and oxygen injection being used to increase pyrolytic reforming of RDF 108 into syngas 109. For the present invention, full combustion of RDF 108 is not undertaken in the pyrolysis gasifier 107. Instead, syngas 109 is continuously released in the absence of oxygen by pyrolytic reactions of RDF 108 in the pyrolysis gasifier 107 typically operating at temperatures variously ranging up to 950° Celsius, with the produced syngas 109 being conveyed and delivered to downstream gas handling and gas-to-liquid (GTL) fuel production 110. The calcium carbonate and calcium oxide from the second slipstream 106 act as fluxing agents and sorbents to bind with and remove undesired impurities, which may include unreacted excess $CO_2$, acid gasses associated with sulfur, chlorine, as well as other elemental particulate matter generated during the production of syngas 109. The adsorbed acid gases and particulate matter would likely be detrimental to downstream equipment or would reduce the efficiency of downstream Fischer-Tropsch catalytic GTL conversion reactions and other refining methods associated with the WTE Process 100-B. Common products of GTL fuel production are straight-chain alkanes, with carbon atom content of 10 or greater which can be used as diesel fuels and jet fuels. During the combined pyrolysis process to produce syngas 108, most of the remaining calcium carbonate ($CaCO_2$) from the second slipstream 106 is converted to calcium oxide (CaO). Byproducts of the pyrolysis gasification step also include carbonaceous char and ash.

The reacted limestone, biochar and ash 111 are discharged from the pyrolysis gasifier 107 and transported to the second-stage preheater and mixer 105 via a third slipstream 113, thereby being returned to the PCP process 100-A, where it is combined with the preheated comminuted limestone from the first slipstream 104 and cementitious meal materials 114. The cementitious meal materials 114 can include limestone and other add mixtures of fly ash, clay, bauxite, iron ore, gypsum and sand being corrective and critical crushed additives. The reacted limestone, biochar and ash 111, the pre-heated comminuted limestone from the first slipstream 104, and the cementitious meal materials 114 are then mixed and heated to calcinating temperatures in a second-state preheater and mixer 105 for discharge as a homogeneous limestone and meal mix 115, which is conveyed into a high-temperature rotary kiln 116. Inside the high-temperature rotary kiln 116, the homogeneous limestone and meal mix 115 is superheated to sintering temperatures, which typically reach 1450° Celsius, thereby producing cement clinkers 117, which are discharged from the high-temperature rotary kiln 116. The cement clinkers 117 are then converted to cement, by pulverization, in a downstream process, which is well known in the art. In order to minimize any process heat and pressure loss during the transport of materials between the PCP process 100-A and the WTE process 100-B, and particularly during the delivery of a minor portion of the preheated comminuted limestone from the first-stage preheater 103 the pyrolysis gasifier 107, as well as the delivery of the reacted limestone, char and ash 111 from the pyrolysis gasifier 107 to the second-stage preheater and mixer 105, sealed gates and injection screw augers, which are well known to the art of material handling, may be selected to successfully transport these materials. Char that is extracted along with reacted limestone and char from the pyrolysis gasifier 107, may be optionally separated from the reacted limestone and ash as biochar 112, which can be used for the manufacture of, carbon fiber, graphite, graphene (a graphite allotrope of carbon containing numerous double bonds) or other advanced materials made from carbon. Another option is to separate the carbonaceous char and ash from the reacted limestone, before all three components enter the second-stage preheater and mixer 105, for use as additional source of renewable energy for the downstream high-temperature rotary kiln 116 during the high energy sintering process which forms cement clinkers 117.

From the previous detailed description of the invention, it should be clear that the previously disclosed art in the Description of the Related Art section fails to teach the innovation of the present invention. The present invention solves impracticalities and improves the shortcomings of Boardman, Clayson, Carlson and Liu by providing an improved method of renewable energy production independent of local oil shale production for its feedstock. For the present invention, comminuted limestone borrowed from a concurrent and co-located cement production process is used as a substitute sorbent input in place of spent oil shale char, with said limestone also containing calcium compounds comingled together with refuse derived fuel (RDF) originated from municipal solid waste (MSW) and continuously heated to produce cleaner renewable energy from synthesis gasses.

Another feature of the present invention, that distinguishes it from the disclosed related art, is that there is no return of the calcium compounds used as sorbents to their original chemical state or location in the specified calcium cycle. Instead, reacted comminuted limestone borrowed from the Portland cement manufacturing process is returned to that process downstream whence it was borrowed. Therefore, the present invention is not making claims as to chemical reactions of calcium but, rather, is implementing a conjoining of cement production with renewable energy production.

The Carlson reference (U.S. Pat. No. 9,169,440 B2) indicates that spent oil shale char contains a sufficient plurality of calcium (with available oxygen and carbon) which may react as a sorbent of produced acid gasses generated during joint MSW pyrolysis. Spent oil share char depleted of hydrocarbons is similar in chemical composition to raw limestone both having a plurality of calcium. With limestone borrowed from the Portland cement manufacturing process substituting for spent oil shale, similar resulting chemical reactions with detected acid gasses produced during joint MSW pyrolysis cause the formation of an array of trace byproduct calcium salts (such as calcium silicates and calcium aluminates along with calcium phosphate, calcium chloride, calcium sulfate, or calcium nitrate) with some excess produced water which are useful salts available for the cement production process. After the purposeful absorption and scrubbing of unwanted acid gasses and other potential carbon dioxide during RDF pyrolysis, these produced calcium salts or calcium carbonate are not retreated and then reused for scrubbing but are returned in a continuous material stream to the borrowed source to be a supplemental part of and act as components and well-known chemical enhancements to the strength and durability of Portland cement (See, for example, Neto, J. S. A., et. al., "Effects of Sulfates on the Hydration of Portland Cement—A review," Construction and Building Materials. Volume 279, 12 Apr. 2021, 122428). Thus, the comminuted limestone, borrowed from the Portland cement manufacturing process, acts to both purify renewable synthesis gasses and to improve the cement products. Contrary to the heretofore disclosed Liu reference, the present invention discloses much different mass ratios of organic matter to inorganic matter for conducting continuous and non-linear thermal reduction process methods. While some calcium and CO2 reactions may transpire, the present invention focuses on other arguments and reactions of calcium. As such, the present invention is not calcium looping as currently known and published in the public domain.

In the known art, the calcium looping process, which is impractical for use for the present invention, is a closed cycle that always ends where it starts. The present invention, on the other hand, removal of acidic gas species found in synthesis gasses produced during pyrolysis of refuse derived fuels (RDF) obtained from Municipal Solid Wastes (MSW) is accomplished by continuously borrowing a minor portion of a comminuted calcium particle feed stream that is being conveyed to a cement making process, and continuously introducing that minor portion into a separate pyrolytic process, where that minor portion of particles is comingled with RDF and serves as a sorbent of harmful acid gasses and other harmful compounds, which are byproducts of the pyrolytic process, said minor portion of particles being at least partially converted to calcium salts. The minor portion of particles, after having performed its sorbent function, is continuously returned to the comminuted calcium particle feed stream, downstream of its previous removal, for further processing in the cement manufacturing process.

Unlike the heretofore disclosed related art, the present invention essentially uses calcium attrition and other chemical reactions selected from an array of reactions including calcium sulfation, which are typically undesirable reactions in the aforementioned calcium looping systems. The heated comminuted limestone borrowed from the Portland cement manufacturing process acts as a primary sorbent to capture reactive materials being comprised of undesirable elemental species that may be prevalent in gasification methods that are used in the production systems of renewable energy. Additionally, the borrowed comminuted limestone may also capture some carbon dioxide during the comingled calcium/RDF pyrolysis process. Friability of calcium oxide into smaller particles by attrition and kinetic action contained in, for example, a rotary kiln gasifier, it being selected from an array of similarly suitable and common gasifier equipment, is useful to create greater surface processing of concurrent elements using more available particles in motion. Furthermore, sulfur can be acidic and is a poisonous and polluting species persistent in synthesis gasses derived from pyrolysis of RDF. For the present invention, the calcium sulfation reaction and other similar calcium reactions are useful for removing and scrubbing synthesis acid gasses during pyrolysis in the presence of heated comminuted limestone. The reactions of indirect and direct calcium sulfation are given by $CaO+SO2+½\ O2 \rightarrow CaSO4$ and $CaCO3+SO2+½\ O2 \rightarrow CaSO4+CO2$ respectively. The difficult reversibility of these acidic reactions creates calcium salts that are useful compounds for the production of Portland cement. Thus, by conjoining renewable energy production with cement production, the discharge of pollution into the environment is remediated.

Although only one embodiment of the invention has been shown and described, it will be obvious to those having ordinary skill in the art that changes and modifications may be made thereto without departing from the scope and the spirit of the invention. For example, although the preferred conjoining of Portland cement manufacturing and waste-to-energy production is accomplished at a single site, where vertical integration maximizes the sharing of infrastructure, transportation systems, processing equipment, utilities, power, and human resources, it is also envisioned that the conjoining of the two processes can occur with far less vertical integration. For example, The Portland cement manufacturing and waste-to-energy production may be operated at different sites, using two sources of comminuted limestone, and transporting the reacted limestone, char and ash from the waste-to-energy production to the Portland cement manufacturing process site at the second-stage preheater and mixer 105 stage. However, such an arrangement would certainly not be optimum, as significant inefficiencies would occur. Those inefficiencies would include, but would certainly not be limited to, unnecessary duplication of processing equipment and unrecoverable loss of energy, in the form of heat, during the transport of the reacted limestone, char and ash to the Portland cement production site.

What is claimed is:

1. A pair of simultaneous processes which are conjoined in order to share infrastructure, reduce thermal expenditures, and reduce pollution, said conjoined process comprising:

a Portland cement production (PCP) process which receives comminuted limestone as a primary material input for the PCP process, said comminuted limestone being heated in a first preheater;

a waste-to-energy (WTE) production process which receives refuse-derived fuels (RDF) as a primary material input and a minor portion of the comminuted limestone following its heating in the first preheater, said minor portion functioning as a secondary material input for the WTE process, and being commingled with the RDF and functioning as a fluxing agent and sorbent to bind with and remove undesired impurities during pyrolysis of the RDF in a pyrolysis gasifier during production of syngas; and means for removing pyrolysis byproducts, which include reacted comminuted limestone, carbonaceous char, and ash, from the pyrolysis gasifier, and transporting them back to the PCP process, where they are commingled with a major portion of the comminuted limestone from the first preheater, and cementitious meal materials in a second stage preheater before being sent to a high-temperature rotary kiln, where they are sintered and vitrified into cement clinkers.

2. The pair of simultaneous processes of claim 1, wherein the conjoined processes are located adjacent one another at a single manufacturing site.

3. The pair of simultaneous process of claim 2, wherein the processes for PCP production and for WTE conversion are conjoined for the following reasons:

the WTE process is providing a component to the meal mix for the PCP process;

the WTE process and the PCP processes are adjacent one another, and the comminuted limestone introduced into the pyrolysis gasifier is borrowed, as a minor portion, from a comminuted limestone feed stream of the PCP process, where it is also preheated before entry into the pyrolysis gasifier, with little loss of heat energy during conveyance to and introduction into the pyrolysis gasifier.

4. The pair of simultaneous process of claim 1, wherein the pair of processes are:

thermally conjoined, in that heat generated in the PCP process is transferred to the WTE process;

physically conjoined, in that they share colocation, being physically located adjacent one another;

equipment conjoined, in that they share a common limestone comminutor; and materially conjoined, in that each process receives feedstock necessary to its own process from the other process.

5. The pair of simultaneous processes of claim 1, wherein the conjoined processes are located at different manufacturing sites, and the reacted comminuted limestone, char and ash from the waste-to-energy production is transported to the site of Portland cement manufacturing, and enters the Portland cement manufacturing process at a second-stage preheater and mixer stage.

6. A Portland cement production (PCP) process that is conjoined with a waste-to-energy (WTE) process, said conjoined process comprising the steps of:

introducing pre-heated comminuted limestone and refuse-derived fuels (RDF) into a pyrolysis gasifier;

comingling the pre-heated comminuted limestone and RDF within the pyrolysis gasifier;

heating the comingled pre-heated comminuted limestone and RDF within the pyrolysis gasifier to create syngas, said pre-heated comminuted limestone acting as a fluxing agent and sorbent to react with and remove undesired impurities during pyrolysis of the RDF within the pyrolysis gasifier;

capturing syngas produced within the pyrolysis gasifier and converting it to liquid organic fuels;

extracting other reaction products from the pyrolysis gasifier, which include reacted comminuted limestone, biochar and ash; and introducing at least the comminuted limestone of the other reaction products into the PCP process as a component of a meal mix for sintering into cement clinkers.

7. The conjoined process of claim 6, wherein the biochar is separated from the other reaction products for use in the production of organic compounds selected from the group consisting of carbon black, carbon fiber, graphite, and graphene.

8. The conjoined process of claim 6, wherein the preheated comminuted limestone is borrowed, as a minor portion, from a comminuted limestone material feed stream associated with the PCP process.

9. The conjoined process of claim 8, wherein the reacted comminuted limestone from the pyrolysis gasifier is returned to the same comminuted limestone material feed stream associated with the PCP process at a point downstream whence the minor portion was borrowed.

10. The conjoined process of claim 6, wherein the PCP process and the WTE process are not conjoined merely because the WTE process is providing a component to the meal mix for the PCP process, but also conjoined both physically and thermally, in the sense that the WTE process and the PCP processes are adjacent one another, and the comminuted limestone introduced into the pyrolysis gasifier is borrowed, as a minor portion, from a comminuted limestone feed stream of the PCP process, where it is also preheated before entry into the pyrolysis gasifier, with little loss of heat energy during conveyance to and introduction into the pyrolysis gasifier.

11. The conjoined process of claim 10, wherein the PCP process and the WTE process share infrastructure, including limestone comminution equipment, transportation and conveyance systems, processing equipment, utilities, power, and human resources.

12. A conjoined manufacturing facility for Portland cement production (PCP) and the conversion of pulverized refuse-derived fuels (RDF) obtained from municipal solid waste (MSW) into usable liquid fuels, said conjoined manufacturing facility comprising:

a supply of quaried limestone used as a principal feedstock of the PCP process;

a comminutor for converting the quaried limestone into a comminuted limestone feedstream;

a first-stage preheater for heating the comminuted limestone feedstream;

a supply of RDF;

a pyrolysis gasifier in which to partially convert the RDF to syngas;

a second slipstream for diverting a minor portion of the comminuted limestone to the pyrolysis gasifier where it is comingled and heated with the RDF, said comminuted limestone within the pyrolysis gasifier acting as a fluxing agent and sorbent to bind with and remove undesired impurities during pyrolysis of the RDF in the pyrolysis gasifier during production of syngas; and a third slipstream for returning comminuted limestone, that has bound with undesired impurities within the pyrolysis gasifier, to the heated comminuted limestone feedstream for use as a secondary feedstock in the production of Portland cement.

13. The conjoined manufacturing facility of claim 12, wherein the syngas produced within the pyrolysis gasifier is removed from the pyrolysis gasifier by gas handling equipment and converted to liquid fuels by gas-to-liquid production processes.

14. The conjoined manufacturing facility of claim 12, wherein the processes for PCP production and for WTE conversion are conjoined for the following reasons:

the WTE process is providing a component to the meal mix for the PCP process;

the WTE process and the PCP processes are adjacent one another, and the comminuted limestone introduced into the pyrolysis gasifier is borrowed, as a minor portion, from a comminuted limestone feed stream of the PCP process, where it is also preheated before entry into the pyrolysis gasifier, with little loss of heat energy during conveyance to and introduction into the pyrolysis gasifier.

15. The conjoined manufacturing facility of claim 12, wherein infrastructure, including limestone comminution equipment, transportation and conveyance systems, processing equipment, utilities, power, and human resources, are shared for Portland cement production (PCP) and the conversion of pulverized refuse-derived fuels (RDF) obtained from municipal solid waste (MSW) into usable liquid fuels.

16. The conjoined manufacturing facility of claim 12, wherein biochar, one of the byproducts of pyrolysis within the pyrolysis gasifier, is separated from the comminuted limestone used within the pyrolysis gasifier for use in the production of organic compounds selected from the group consisting of carbon black, carbon fiber, graphite, and graphene.

17. The conjoined manufacturing facility of claim 12, which further comprises:

a second-stage preheater and mixer, into which a first slipstream, containing a major portion of comminuted limestone from the first-stage preheater, the third slipstream, and other cementitious meal materials are fed and mixed together into a homogeneous limestone and meal mix;

a high-temperature rotary kiln, which is continuously fed with the homogeneous limestone and meal mix from the second-stage preheater and mixer, and which produces cement clinkers, which are subsequently pulverized to produce powdered cement.

18. The conjoined manufacturing facility of claim 12, wherein Portland cement production (PCP) and the conversion of pulverized refuse-derived fuels (RDF) obtained from municipal solid waste (MSW) into usable liquid fuels are conjoined for the following reasons:

the process for converting pulverized refuse-derived fuels (RDF) obtained from municipal solid waste (MSW) into usable liquid fuels is providing a component to the meal mix for the PCP process; and the process for converting pulverized refuse-derived fuels (RDF) obtained from municipal solid waste (MSW) into usable liquid fuels WTE process and the PCP process are adjacent one another, and the comminuted limestone introduced into the pyrolysis gasifier is borrowed, as a minor portion, from a comminuted limestone feed stream of the PCP process, where it is also preheated before entry into the pyrolysis gasifier, with little loss of heat energy during conveyance to and introduction into the pyrolysis gasifier.

* * * * *